United States Patent
Lee et al.

(10) Patent No.: US 9,077,987 B2
(45) Date of Patent: Jul. 7, 2015

(54) METHOD OF DISPLAYING THREE-DIMENSIONAL IMAGE AND DISPLAY APPARATUS FOR PERFORMING THE METHOD

(75) Inventors: Jun-Pyo Lee, Asan-si (KR); Eui-Jeong Kang, Asan-si (KR); Jae-Eun Um, Cheonan-si (KR); Hwan-Woong Lee, Asan-si (KR); Kang-Min Kim, Seoul (KR); Jung-Won Kim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 300 days.

(21) Appl. No.: 13/327,858

(22) Filed: Dec. 16, 2011

(65) Prior Publication Data

US 2012/0256908 A1 Oct. 11, 2012

(30) Foreign Application Priority Data

Apr. 8, 2011 (KR) ........................ 10-2011-0032705

(51) Int. Cl.
*H04N 13/02* (2006.01)
*H04N 13/04* (2006.01)
*G09G 3/00* (2006.01)
*G09G 3/34* (2006.01)

(52) U.S. Cl.
CPC ....... *H04N 13/0497* (2013.01); *H04N 13/0438* (2013.01); *G09G 3/003* (2013.01); *G09G 3/342* (2013.01); *G09G 2320/0209* (2013.01); *G09G 2320/0238* (2013.01); *G09G 2320/0252* (2013.01); *G09G 2320/064* (2013.01); *G09G 2310/0264* (2013.01)

(58) Field of Classification Search
USPC .......................................... 348/712; 345/419
See application file for complete search history.

(56) References Cited

U.S. PATENT DOCUMENTS

| | | | | |
|---|---|---|---|---|
| 2009/0245347 | A1* | 10/2009 | Lee et al. | 375/240.01 |
| 2011/0254932 | A1* | 10/2011 | Doung | 348/56 |
| 2012/0013601 | A1* | 1/2012 | Park et al. | 345/419 |

FOREIGN PATENT DOCUMENTS

| | | |
|---|---|---|
| JP | 2005-049822 A | 2/2005 |
| KR | 1020070069707 A | 7/2007 |
| KR | 1020100012599 A | 2/2010 |

* cited by examiner

*Primary Examiner* — David Zarka
*Assistant Examiner* — Richard M Russell
(74) *Attorney, Agent, or Firm* — Cantor Colburn LLP (57) ABSTRACT

A method of displaying a three-dimensional image includes sequentially providing light to display blocks of a display panel in a scan direction of an image, providing light at a maximum luminance to a display block during a first period in which an image for a left-eye or a right-eye is displayed on the display block, providing the light at a luminance gradually decreasing from the maximum luminance to a preset luminance to the display block during a second period in which a transition image between the left-eye or the right-eye image and a black image is displayed on the display block, and blocking the light from the display block during a third period including a period in which the black image is displayed on the display block and prior to a period in which a left-eye or a right-eye image of a following frame is displayed on the display block.

20 Claims, 9 Drawing Sheets

METHOD OF DISPLAYING THREE-DIMENSIONAL IMAGE AND DISPLAY APPARATUS FOR PERFORMING THE METHOD

This application claims priority to Korean Patent Application No. 2011-0032705, filed on Apr. 8, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method of displaying a three-dimensional ("3D") image and a display apparatus for performing the method. More particularly, exemplary embodiments of the invention relate to a method of displaying a 3D image with improved display quality of the 3D image and a display apparatus for performing the method.

2. Description of the Related Art

Generally, a liquid crystal display ("LCD") displays a two-dimensional ("2D") image. Recently, the LCD that displays a 3D image has been developed since demands for the 3D image has been increased in various industrial fields such as games, movies and so on.

Generally, the 3D image display device displays the 3D image using the principle of binocular parallax through two eyes of human. For example, since two eyes of human are spaced apart from each other, images viewed at the different angles are inputted to the brain of human. Thus, the observer may watch the 3D image to recognize the stereoscopic image through the display device.

The stereoscopic image display device is classified into a stereoscopic type with an extra spectacle and an auto-stereoscopic type without the extra spectacle. The stereoscopic type includes a passive polarized glasses method with a polarized filter having a different polarized axis according to two eyes, and an active shutter glasses method. In the active shutter glasses method, a left-eye image and a right-eye image are time-divided to be periodically displayed, and a pair of glasses which sequentially open or close a left-eye shutter and a right-eye shutter respectively synchronized with the periods is used.

The passive polarized glasses method decreases luminance value of the 3D image luminance value of the 3D image by the polarized filter that divides the left-eye image and the right-eye image. In addition, in the active shutter glasses method, when a liquid crystal ("LC") response time of the shutter glasses is substantially improved, a crosstalk between the left-eye image and the right-eye image is substantially improved. Although the LC response time has physical limit, the backlight may be driven by a scan driving mode such that the crosstalk between the left-eye image and the right-eye image is substantially improved. However, in the scan driving mode, luminance value of the 3D image may be substantially decreased.

BRIEF SUMMARY OF THE INVENTION

Exemplary embodiments of the invention provide a method of driving a display panel with improved luminance value of the 3D stereoscopic image.

Exemplary embodiments of the invention also provide a display apparatus performing the method of displaying the 3D stereoscopic image.

According to an exemplary embodiment of the invention, a method of driving a display panel includes: sequentially providing light to a plurality of display blocks of a display panel in a scan direction of an image; providing the light at a maximum luminance to a display block during a first period in which a left-eye or a right-eye image is displayed on the display block; providing the light at a luminance gradually decreasing from the maximum luminance to a preset luminance to the display block during a second period in which a transition image between the left-eye or the right-eye image and a black image is displayed on the display block; and blocking the light from the display block during a third period including a period in which the black image is displayed on the display block and prior to a period in which a left-eye or a right-eye image of a following frame is displayed on the display block.

In an exemplary embodiment, the light of the maximum luminance may be provided to the display block during an interval from a first timing delayed from when a data signal of the left-eye or the right-eye image is provided to the display block, to a second timing when a data signal of the block image is provided to the display block.

In an exemplary embodiment, the light gradually decreasing may be provided to the display block during an interval from the second timing when the data signal of the block image is provided to the display block to the display block to a third timing. The third timing may be when the LC response ratio of the display block corresponding to the data signal of the left-eye or the right-eye image becomes a low threshold value.

In an exemplary embodiment, the light may be blocked from the display panel from the third timing to a fourth timing. The fourth timing may be when the LC response ratio of the display block corresponding to the left-eye or the right-eye data signal of the following frame becomes the high threshold value.

According to an exemplary embodiment of the invention, a method of displaying a three-dimensional image includes: providing light at a maximum luminance to a display block during a first period in which a left-eye or a right-eye image is displayed on the display block; providing the light at a luminance gradually decreasing from the maximum luminance to a preset luminance to the display block during a second period in which a transition image between the left-eye or the right-eye image and a black image is displayed on the display block; and blocking the light from the display block during a third period including a period in which the black image is displayed on the display block and prior to a period in which a left-eye or a right-eye image of a following frame is displayed on the display block.

According to another exemplary embodiment of the invention, a display apparatus includes a display panel which displays an image, a panel driving part including a plurality of light-emitting blocks arranged in a direction scanning the image, where each of the light-emitting blocks provides light to a display block of the display panel corresponding thereto, and a light-source driving part which drives the light-source part such that the light-source part provides light at a maximum luminance to a display block during a first period in which a left-eye or a right-eye image is displayed on the display block, the light-source part provides the light at a luminance gradually decreasing from the maximum luminance to a preset luminance to the display block during a second period in which a transition image between the left-eye or the right-eye image and a black image is displayed on the display block, and the light-source part blocks the light from the display block during a third period including a period in which the black image is displayed on the display block and prior to a period in which a left-eye or a right-eye image of a following frame is displayed on the display block.

In an exemplary embodiment, the light-source driving part may includes a current generating part which generates a current signal in response to a three-dimensional enable signal, and a signal generating part which provides a plurality of driving signals to the light-emitting blocks based on the current signal.

In an exemplary embodiment, the display apparatus may further include a timing control part which generates a driving control signal of an analogue type and a luminance control signal of the analogue type, and provides the driving control signal of the analogue type and the luminance control signal of the analogue type to the signal generating part, where the driving control signal of the analogue type has a high level during the first period and the second period and has a low level during the third period, and the luminance control signal of the analogue type has a maximum level during the first period, has a level gradually decreasing from the maximum level to a preset level during the second period, and has a minimum level during the third period.

In an exemplary embodiment, the display apparatus may further include a timing control part which generates a light-source control signal of an analogue type, and provides the light-source control signal of the analogue type to the signal generating part, where the light-source control signal of the analogue type has a maximum level during the first period, has a level gradually decreasing from the maximum level to a preset level during the second period, and has a minimum level during the third period.

In an exemplary embodiment, the light-source driving part may include a current generating part which generates a current signal in response to a three-dimensional enable signal, a signal converting part which converts a control signal of a digital type into a control signal of an analogue type, and a signal generating part which provides a plurality of driving signals to the light-emitting blocks based on the current signal.

In an exemplary embodiment, the display apparatus may further include a timing control part which generates a driving control signal of an analogue type and an luminance control signal of a digital type, and provides the driving control signal of the analogue type and the luminance control signal of the digital type to the light-source driving part, where the driving control signal of the analogue type has a high level during the first period and the second period, and has a low level during the third period, where the luminance control signal of the digital type has a maximum level in the first period, has a level gradually decreasing from the maximum level to a preset level during the second period, and has a minimum level during the third period, and where the driving control signal of the analogue type is provided to the signal generating part, the luminance control signal of the digital type is converted into a luminance control signal of an analogue type by the signal converting part, and the luminance control signal of the analogue type is provided to the signal generating part.

In an exemplary embodiment, the display apparatus may further include a timing control part which generates a driving control signal of a digital type and a luminance control signal of an digital type, and provides the driving control signal of the digital type and the luminance control signal of the digital type to the light-source driving part, where the driving control signal of the digital type has a high level during the first period and the second period, and has a low level during the third period, where the luminance control signal of an digital type has a maximum level during the first period, has a level gradually decreasing from the maximum level to a preset level during the second period, and has a minimum level during the third period, and where the driving control signal of the digital type and the luminance control signal of the digital type are converted into the driving control signal of an analogue type and the luminance control signal of an analogue type, respectively, by the signal converting part, and the driving control signal of the analogue type and the luminance control signal of the analogue type are provided to the signal generating part.

In an exemplary embodiment, the display apparatus may further include a timing control part which generates a light-source control signal of a digital type, and provides the light-source control signal of the digital type to the signal generating part, where the light-source control signal of the digital type has a maximum level during the first period, has a level gradually decreasing from the maximum level to a preset level during the second period, and has a minimum level during the third period, and where the light-source control signal of the digital type is converted into the light-source control signal of an analogue type by the signal converting part, and the light-source control signal of the analogue type is provided to the signal generating part.

According to an exemplary embodiment of the invention, luminance of the light is adjusted based on a LC response time of the transition image between the left-eye or the right-eye image and the black image such that the 3D stereoscopic image of high luminance may be displayed with substantially low power consumption.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

Figure 1:
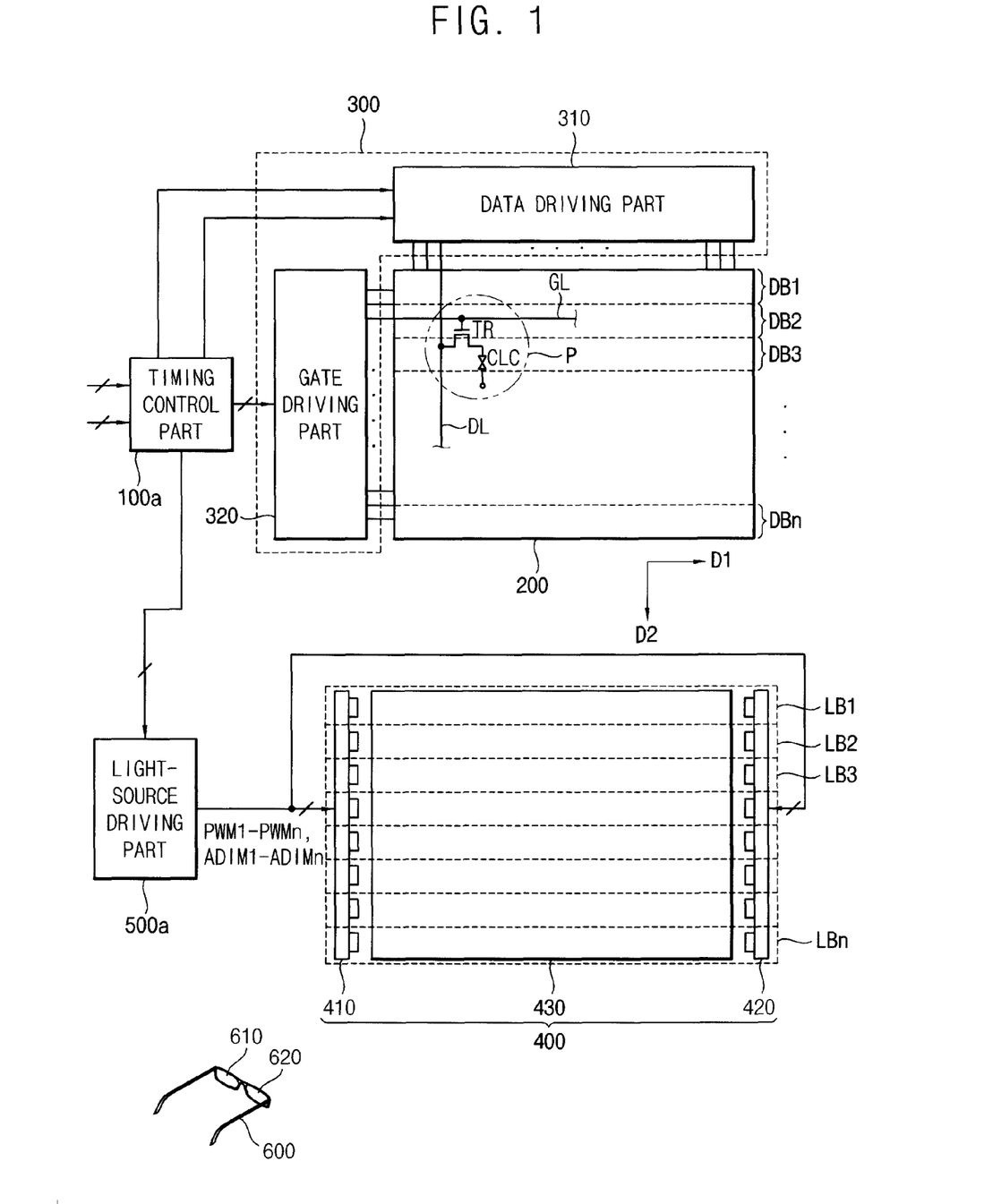
FIG. 1 is a block diagram illustrating an exemplary embodiment of a display apparatus according to the invention.

FIG. 1 is a block diagram illustrating a display apparatus according to an exemplary embodiment of the invention.

Referring to FIG. 1, the display apparatus includes a timing control part 100a, a display panel 200, a panel driving part 300, a light-source part 400 and a light-source driving part 500a. The display apparatus may further include a glasses part 600.

The timing control part 100a receives a source control signal and an image signal. The timing control part 100a generates a timing control signal based on the source control signal and generates a light-source control signal based on the image signal.

The image signal may include a two-dimensional ("2D") image signal and a three-dimensional ("3D") image signal. The 3D image signal may include a left-eye image frame, a right-eye image frame and a black image frame between the left-eye and right-eye image frames. The image frame is an image signal in a unit frame.

The light-source control signal may include a plurality of driving control signals PWM1 to PWMn, which controls, e.g., turns on or turns off, the light-source part 400, and a plurality of luminance control signals ADIM1 to ADIMn, which controls luminance of the light-source part 400. Here, n is a natural number. The timing control part 100a generates the driving control signals PWM1 to PWMn and the luminance control signals ADIM1 to ADIMn based on a liquid crystal ("LC") response time of the display panel 200. The driving control signals PWM1 to PWMn and the luminance control signals ADIM1 to ADIMn will be described in detail with reference to FIGS. 3 and 4.

The display panel 200 includes a plurality of data lines DL, a plurality of gate lines GL and a plurality of pixels P. The gate lines GL extend in a first direction D1 and are arranged in a second direction D2. Each pixel P includes a switching element TR connected to a corresponding data line of the data lines DL and a corresponding gate line of the gate lines GL, and a liquid crystal ("LC") capacitor CLC. When the switching element TR is turned on, LC molecules of the LC capacitor CLC are arranged based on a data signal applied to the data line DL, and the pixel P displays a grayscale corresponding to transmittance of the arranged LC molecules. The display panel 200 displays an image along a scan direction, e.g., the second direction D2, by a progressive scanning method.

The panel driving part 300 may include a data driving part 310 and a gate driving part 320. The data driving part 310 outputs a data signal of an analogue type to the data lines DL based on an image signal and a data timing signal provided from the timing control part 100a. The gate driving part 320 outputs a gate signal to the gate lines GL based on a gate timing signal provided from the timing control part 100a.

The light-source part 400 sequentially provides light to the display panel 200 along the scan direction D2. The light-source part 400 includes a plurality of light-emitting blocks LB1 to LBn arranged in the second direction D2. Each light-emitting block may include a light emitting diode ("LED"). The display panel 200 includes a plurality of display blocks DB1 to DBn corresponding to the light-emitting blocks LB1 to LBn, respectively, and each of the light-emitting blocks LBi provides the light to a display block DBi corresponding thereto. Here, i is a natural number less than or equal to n.

The light-source part 400 may include a first light-emitting module 410, a second light-emitting module 420 and a light guide plate ("LGP") 430. The first and second light-emitting modules 410 and 420 are disposed at left and right sides of the display panel 200, respectively. The LGP 430 is disposed under the display panel 200 and guides the light generated from the first and second light-emitting modules 410 and 420 to the display panel 200. Each of the first and second light-emitting modules 410 and 420 includes the light-emitting blocks LB1 to LBn. In an exemplary embodiment, a pair of the light-emitting modules is disposed at the left and right sides of the display panel 200, but not being limited thereto. In an alternative exemplary embodiment, one light-emitting module may be disposed at one of the left and right sides of the display panel 200.

The light-source driving part 500a drives the light-source part 400 based on a 3D enable signal, the driving control signals PWM1 to PWMn and the luminance control signals ADIM1 to ADIMn provided from the timing control part 100a. In an exemplary embodiment, when the light-source part 400 includes n light-emitting blocks LB1 to LBn, the timing control part 100a provides n driving control signals PWM1 to PWMn and n luminance control signals ADIM1 to ADIMn to the light-source driving part 500a.

In one exemplary embodiment, for example, the light-source driving part 500a controls a high period, during which a first light-emitting block LB1 generates the light, based on a first driving control signal PWM1, and controls a level of a driving signal that is provided to the first light-emitting block LB1 during the high period based on a first luminance control signal ADIM1.

The glasses part 600 includes a left-eye shutter 610 and a right-eye shutter 620, and controls, e.g., opens and closes, the left-eye shutter 610 and the right-eye shutter 620 based on a control of the timing control part 100a.

Figure 2:
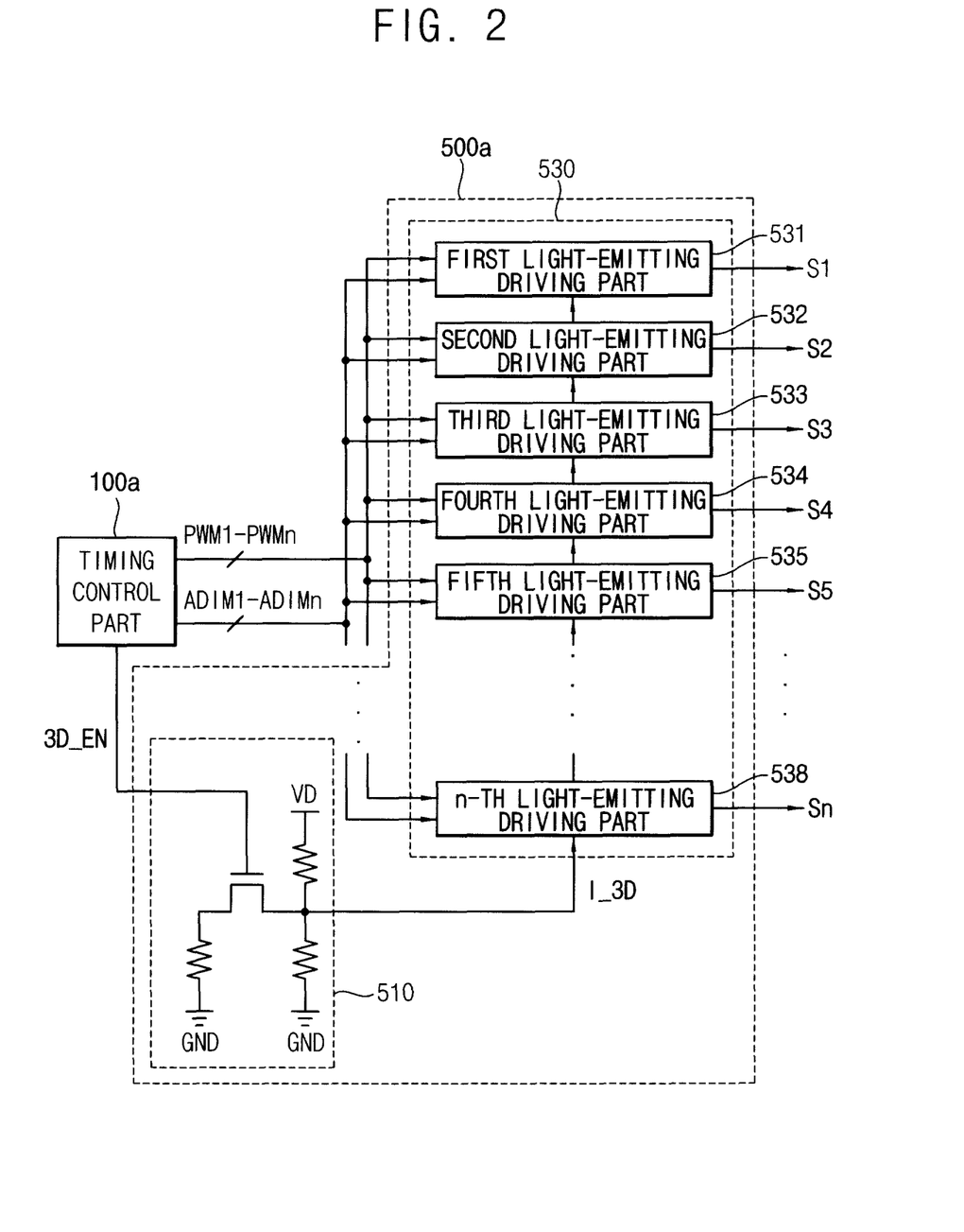
FIG. 2 is a block diagram illustrating an exemplary embodiment of a light-source driving part of FIG. 1.
Figure 3:
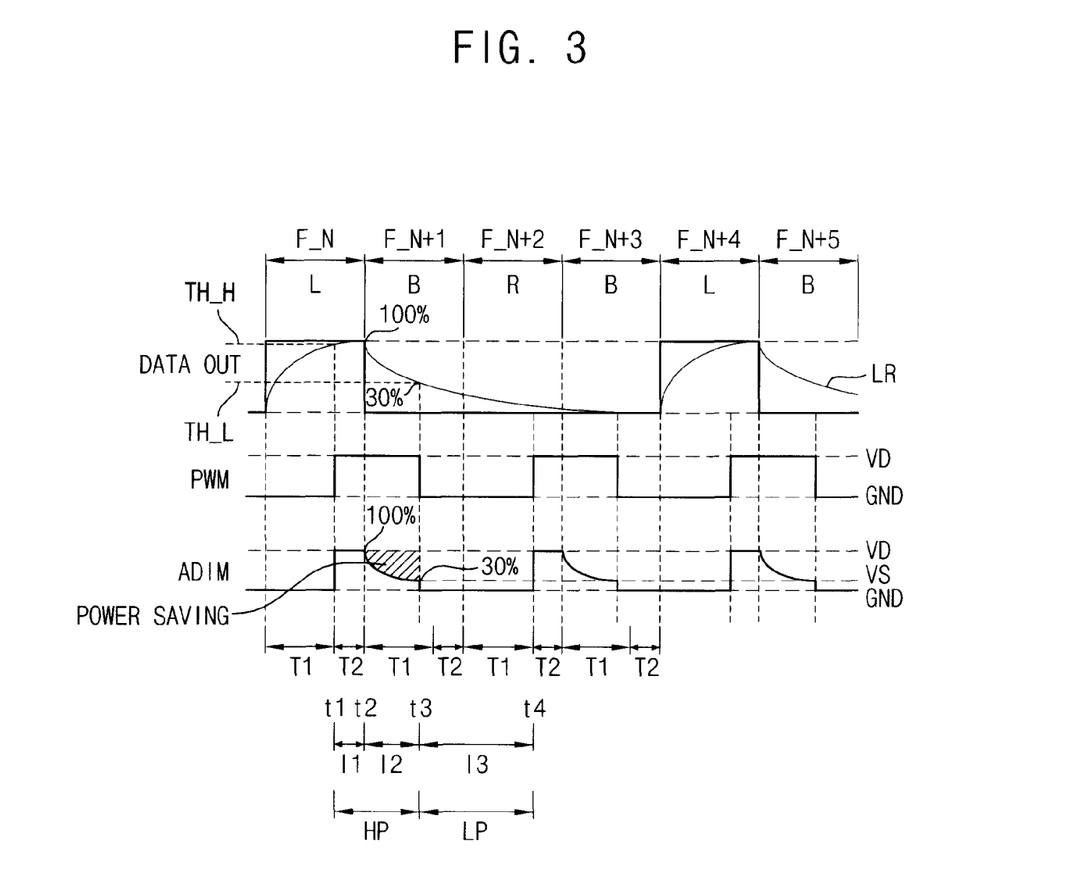
FIG. 3 is a signal timing diagram illustrating an exemplary embodiment of a method of displaying a three-dimensional ("3D") stereoscopic image according to a light-source driving part of FIG. 1.

FIG. 2 is a block diagram illustrating an exemplary embodiment of the light-source driving part of FIG. 1. FIG. 3 is a signal timing diagram illustrating an exemplary embodiment of a method of displaying a 3D stereoscopic image used in a light-source driving part of FIG. 1.

Referring to FIGS. 2 and 3, the light-source driving part 500a includes a current generating part 510 and a signal generating part 530.

The current generating part 510 receives the 3D enable signal 3D_EN provided from the timing control part 100a for identifying a display mode, and generates a current signal I_3D for a 3D display mode based on the 3D enable signal 3D_EN. In one exemplary embodiment, for example, the current generating part 510 may generate a first current signal I_2D in a 2D display mode and may generate a second current signal I_3D in the 3D display mode.

The signal generating part 530 includes a plurality of light-emitting driving parts 531 to 538. The light-emitting driving parts 531 to 538 generate a plurality of driving signals S1 to Sn based on the driving control signals PWM1 to PWMn and the luminance control signals ADIM1 to ADIMn, and provide the driving signals S1 to Sn to the light-emitting blocks LB1 to LBn. The signal generating part 530 may be provided as a single chip.

Referring to FIG. 3, the timing control part 100a generates a driving control signal PWM and a luminance control signal ADIM to control the light-emitting block that provides light to the display block based on an LC response ratio LR corresponding to a data signal outputted to the display block.

In one exemplary embodiment, for example, a left-eye data signal L is outputted to the display block in an N-th frame F_N, a first black data signal B is outputted to the display block in an (N+1)-th frame F_N+1, a right-eye data signal R is outputted to the display block in an (N+2)-th frame F_N+2, a second black data signal B is outputted to the display block in an (N+3)-th frame F_N+3 (Data_OUT). Here, N is a natural number. In an exemplary embodiment, the left-eye data signal L may be referred to as a data signal corresponding to a white image and the right-eye data signal may be referred to as a data signal corresponding to a black image.

Referring to the N-th frame F_N, the left-eye data signal L is applied to the display panel 200 during a first period T1 of the N-th frame F_N, which is an initial period of the N-th frame F_N, and a left-eye image corresponding to the left-eye data signal L is completely displayed on the display panel 200 during a second period T2 of the N-th frame F_N, which is subsequent to the first period T1 of the N-th frame F_N, based on the LC response time. During the first period T1 of the N-th frame F_N, a transition image between a black image of a previous frame and the left-eye image of a present frame is displayed on the display panel 200 such that the left-eye image of the present frame is not completely displayed on the display panel 200.

Referring to the (N+1)-th frame F_N+1, the first black data signal B is applied to the display panel 200 displaying the left-eye image of the previous frame during a first period T1 of the (N+1)-th frame F_N+1, which is an initial period of the (N+1)-th frame F_N+1, and a first black image corresponding to the first black data signal B is completely displayed on the display panel 200 during a second period T2 of the (N+1)-th frame F_N+1, which is subsequent to the first period T1 of the (N+1)-th frame F_N+1, based on the LC response time. During the first period T1 of the (N+1)-th frame F_N+1, a transition image between the left-eye image of the previous frame and the first black image of the present frame is displayed on the display panel 200 such that the first black image of the present frame is not completely displayed on the display panel 200.

Referring to the (N+2)-th frame F_N+2, the right-eye data signal R is applied to the display panel 200 displaying the first black image of the previous frame during a first period T1 of the (N+2)-th frame F_N+2, which is an initial period of the (N+2)-th frame F_N+2, and a the right-eye image corresponding to the right-eye data signal R is completely displayed on the display panel 200 during a second period T2 of the (N+2)-th frame F_N+2, which is subsequent to the first period T1 of the (N+2)-th frame F_N+2, based on the LC response time. During the first period T1 of the (N+2)-th frame F_N+2, a transition image between the first black image of the previous frame and the right-eye image of the present frame is displayed on the display panel 200 such that the right-eye image of the present frame is not completely displayed on the display panel 200.

Referring to the (N+3)-th frame F_N+3, the second black data signal B is applied to the display panel 200 displaying the right-eye image of the previous frame during a first period T1 of the (N+3)-th frame F_N+3, which is an initial period of the (N+3)-th frame F_N+3, and a second black image corresponding to the second black data signal B is completely displayed on the display panel 200 during a second period T2 of the (N+3)-th frame F_N+3, which is subsequent to the first period T1 of the (N+3)-th frame F_N+3, based on the LC response time. During the first period T1 of the (N+3)-th frame F_N+3, a transition image between the right-eye image of the previous frame and the second black image of the present frame is displayed on the display panel 200 such that the second black image of the present frame is not completely displayed on the display panel 200.

In an exemplary embodiment, the timing control part 100a generates the driving control signal PWM and the luminance control signal ADIM to control the light-emitting block that provides light to the display block referring to periods during which the left-eye image, the right-eye image and the black image are displayed on the display block based on the LC response time, as described above.

The driving control signal PWM includes a high period HP having a high level VD, which turns on the light-emitting block, and a low period LP having a low level GND, which turns off the light-emitting block. The high period HP includes the second period T2 of the N-th frame F_N, during which the left-eye image is completely displayed on the display block, and a portion of the first period T1 of the (N+1)-th frame F_N+1, during which the transition image between the left-eye image and the black image is displayed on the display block. The low period LP includes the other portion of the first period T1 of the (N+1)-th frame F_N+1, the second period T2 of the (N+1)-th frame F_N+1, during which the black image is completely displayed on the display block, and the first period T1 of the (N+2)-th frame F_N+2, during which the transition image between the black image and the right-eye image is displayed on the display block.

In one exemplary embodiment, for example, the driving control signal PWM includes the high period HP having the high level VD and the low period LP having the low level GND. The high period HP corresponds to an interval from a first timing t1 when an LC response ratio LR of the left-eye or the right-eye data signal becomes a high threshold value TH_H, to a third timing t3 when the LC response ratio LR of the left-eye or the right-eye data signal becomes a low threshold value TH_L by the black data signal. The low period LP corresponds to an interval from a timing when the LC response ratio LR of the left-eye or the right-eye data signal becomes less than the low threshold value TH_L by the black data signal, to a timing when an LC response ratio LR of the following left-eye or the right-eye data signal becomes the high threshold value TH_H. In one exemplary embodiment, for example, the high threshold value TH_H may be referred to as about 90% and the low threshold value TH_L may be referred to as about 30%. In an exemplary embodiment, however, the high threshold value TH_H and the low threshold value TH_L may be preset variously and not limited thereto.

The luminance control signal ADIM is time-modulated based on the LC response ratio LR during the high period HP of the driving control signal PWM. The luminance control signal ADIM has a maximum level VD during a first period I1, a changing level, gradually decreasing from the maximum level VD to a preset level VS, during a second period I2 and a minimum level GND during a third period I3.

In an exemplary embodiment, the LC response ratio LR of the left-eye or the right-eye data signal becomes about 90% to about 100% during the first period I1. In such an embodiment, the first period I1 corresponds to an interval from a first timing t1 delayed from when the left-eye or the right-eye data signal is applied to the display block, to a second timing t2 when the data signal of the black image applied to the display block. The LC response ratio LR of the left-eye or the right-eye data signal falls from about 100% to about 30% during the second period I2 by the data signal of the black image. In such an embodiment, the second period I2 corresponds to an interval from the second timing t2 to the third timing t3. During the second period I2, the luminance control signal ADIM has a changing level gradually decreasing from the maximum level VD to the preset level VS based on the LC response ratio LR. The third period I3 corresponds to an interval from a timing when the LC response ratio LR of the left-eye or the right-eye data signal falls to less than about 30% by the black data signal, to a timing when an LC response ratio LR of the left-eye or the right-eye data signal corresponding to the following frame becomes about 90%. In such an embodiment, the third period I3 corresponds to an interval from the third timing t3 to a fourth timing t4.

The signal generating part 530 generates the driving signal based on the driving control signal PWM and the luminance control signal ADIM, and provides the driving signal to the light-emitting block.

In an exemplary embodiment, the light-emitting block provides light to the display block corresponding to the light-emitting block based on the driving signal. The light-emitting block provides the light at a maximum luminance to the display block during the first period I1 in which the left-eye or the right-eye image is completely displayed on the display block. The light-emitting block provides the light at a luminance gradually decreasing from the maximum luminance to the preset luminance, to the display block during the second period I2 in which the transition image between the right-eye image and the black image is displayed on the display block. The light-emitting block blocks the light from the display block during the third period I3 in which the black image is completely displayed on the display block and the following left-eye or the right-eye image is not completely displayed on the display block.

In the 3D display mode, luminance of the light is adjusted based on the LC response time of the transition image between the left-eye or the right-eye image and the black image such that the 3D stereoscopic image of high luminance is displayed with substantially low power consumption. In such an embodiment, the luminance of the light is gradually decreased in the second period I2 such that the power consumption is substantially decreased. In such an embodiment, the saved power may be used for boosting the current signal I_3D such that the 3D stereoscopic image of the high luminance is displayed.

In an exemplary embodiment, the luminance of the light is decreased in the second period I2 during which the transition image between the left-eye or the right-eye image and the black image is displayed such that a 3D crosstalk is substantially decreased, display quality of the 3D stereoscopic image is substantially improved.

Figure 4:
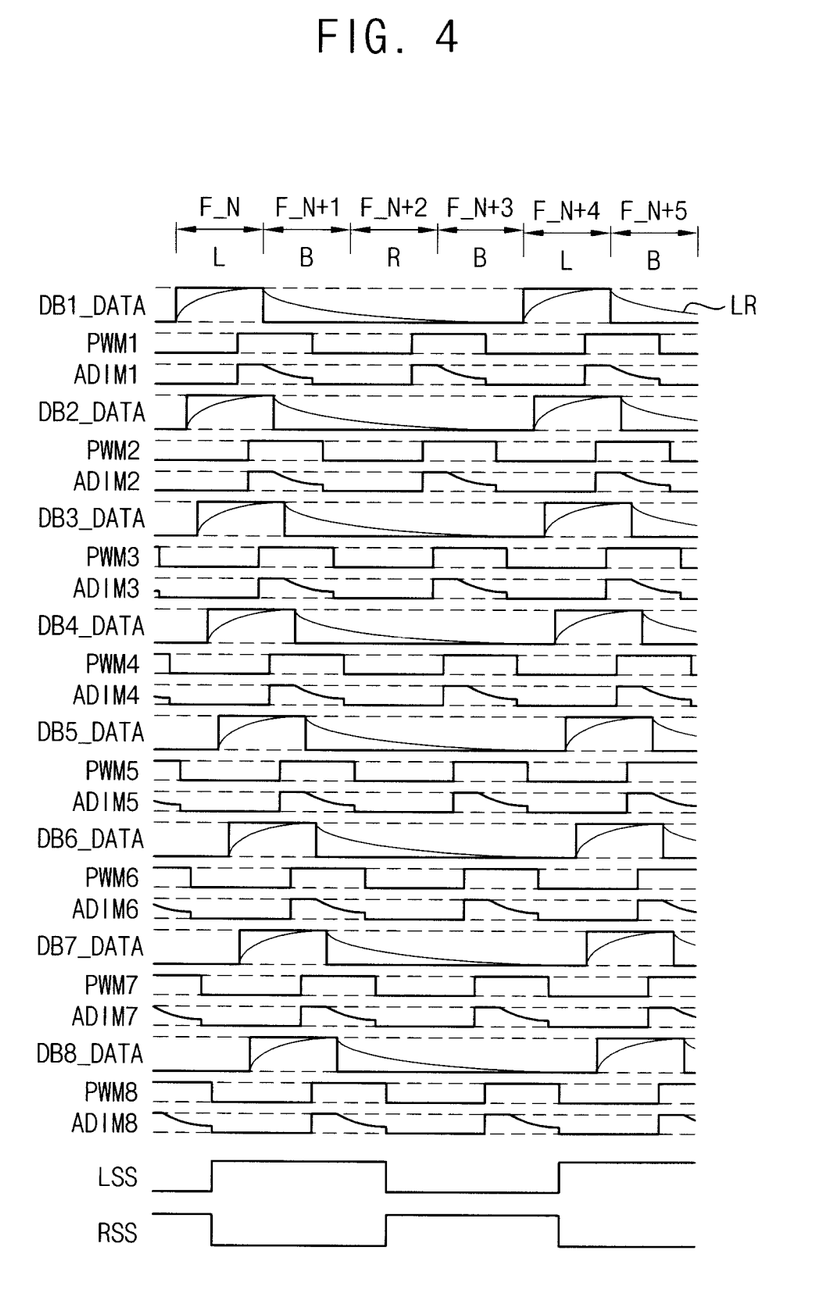
FIG. 4 is a signal timing diagram illustrating an exemplary embodiment of a method of displaying a 3D stereoscopic image used in the display apparatus of FIG. 1.

FIG. 4 is a signal timing diagram illustrating an exemplary embodiment of a method of displaying a 3D stereoscopic image used in the display apparatus of FIG. 1.

Referring to FIGS. 1, 2 and 4, the light-source part 400 may include first to eighth light-emitting blocks LB1 to LB8. The first to eighth light-emitting blocks LB1 to LB8 provide light to first to eighth display blocks DB1 to DB8.

The timing control part 100a provides a left-eye image frame L, a black image frame B, a right-eye image frame R and a black image frame B to the panel driving part 300 with 240 hertz (Hz). In exemplary embodiment, the left-eye image frame may be referred to as a white image frame and the right-eye image frame R may be referred to as a black image frame.

The panel driving part 300 provides a data signal of the left-eye image frame L to the display panel 200 during an N-th frame F_N, provides a data signal of a first black image frame B to the display panel 200 during an (N+1)-th frame F_N+1, provides a data signal of the right-eye image frame R during an (N+2)-th frame F_N+2 and provides a data signal of a second black image frame B to the display panel 200 during an (N+3)-th frame F_N+3. The display panel 200 completely displays an image corresponding to the data signal after a timing delayed from a timing when the data signal is applied to the display block based on an LC response time.

The timing control part 100a provides first to eighth driving control signals PWM1 to PWM8 and first to eighth luminance control signals ADIM1 to ADIM8 to the light-source driving part 500a.

Hereinafter, an exemplary embodiment of a method of driving a first display block DB1 and a first light-emitting block LB1 corresponding to the first display block DB1 will be described.

A data signal of the left-eye image frame L is provided to the first display block DB1 during a period beginning at an initial part of the N-th frame F_N, a data signal of the black image frame B is provided to the first display block DB1 during a period beginning at an initial part of the (N+1)-th frame F_N+1, a data signal of the right-eye image frame R is provided to the first display block DB1 during a period beginning at an initial part of the (N+2)-th frame F_N+2 and a data signal of the black image frame B is provided to the first display block DB1 during a period beginning at an initial part of the (N+3)-th frame F_N+3 (DB1_DATA).

A first driving control signal PWM1 and a first luminance control signal ADIM1 are provided to a first light-emitting driving part 531 of the light-source driving part 500a. The first driving control signal PWM1 includes the high period having the high level and the low period having the low level. The high period corresponds to an interval from a timing when the LC response ratio LR of the left-eye or the right-eye data signal L or R becomes about 100%, to a timing when the LC response ratio LR of the left-eye or the right-eye data signal L or R falls to about 30% by the data signal B of the black image frame. The low period corresponds to an interval from a timing when the LC response ratio LR of the left-eye or the right-eye data signal L or R becomes less than about 30% to a timing before the LC response ratio LR of the left-eye or the right-eye data signal L or R of the following frame becomes about 100%.

The first luminance control signal ADIM1 has a period in synchronization with the first driving control signal PWM1 and is time-modulated based on the LC response ratio LR during the high period of the first driving control signal PWM1. The first luminance control signal ADIM1 has a maximum level during the first period in which the LC response ratio LR becomes about 100%, and a changing level gradually decreasing from the maximum level to the preset level during the second period in which the LC response ratio LR falls from about 100% to about 30%.

The first light-emitting driving part 531 generates a first driving signal S1 based on the first driving control signal PWM1 and the first luminance control signal ADIM1 and provides the first driving signal S1 to a plurality of light emitting diodes ("LED"s) of the first light-emitting block LB1. Thus, the first light-emitting block LB1 provides the light at the maximum luminance to the display block during the first period I1 in which the left-eye or the right-eye image is completely displayed on the first display block DB1. The first light-emitting block LB1 provides the light at a luminance gradually decreasing from the maximum luminance to the preset luminance to the first display block DB1 during the second period I2 in which the transition image between the right-eye image and the black image is displayed on the first display block DB1. The first light-emitting block LB1 blocks the light from the first display block DB1 during the third period I3 in which the black image is completely displayed on the first display block DB1 and the transition image between the black image and the left-eye or the right-eye image is displayed on the first display block DB1.

Hereinafter, an exemplary embodiment of a method of driving a fifth display block DB5 and a fifth light-emitting block LB5 corresponding to the fifth display block DB5 will be described.

The data signal of the left-eye image frame L is provided to the fifth display block DB5 during a period beginning at a middle part of the N-th frame F_N, the data signal of the black image frame B is provided to the fifth display block DB5 during a period beginning at a middle part of the (N+1)-th frame F_N+1, the data signal of the right-eye image frame R is provided to the fifth display block DB5 during a period beginning at a middle part of the (N+2)-th frame F_N+2 and the data signal of the black image frame B is provided to the fifth display block DB5 during a period beginning at a middle part of the (N+3)-th frame F_N+3 (DB5 DATA).

A fifth driving control signal PWM5 and a fifth luminance control signal ADIM5 are provided to a fifth light-emitting driving part 535 of the light-source driving part 500a. The fifth driving control signal PWM5 includes the high period having the high level and the low period having the low level. The high period corresponds to an interval from a timing when the LC response ratio LR of the left-eye or the right-eye data signal L or R becomes about 100%, to a timing when the LC response ratio LR of the left-eye or the right-eye data signal L or R falls to about 30% by the data signal B of the black image frame. The low period corresponds to an interval from a timing when the LC response ratio LR of the left-eye or the right-eye data signal L or R becomes less than about 30%, to a timing before the LC response ratio LR of the left-eye or the right-eye data signal L or R of the following frame becomes about 100%.

The fifth luminance control signal ADIM5 has a period in synchronization with the fifth driving control signal PWM5 and is time-modulated based on the LC response ratio LR during the high period of the fifth driving control signal PWM5. The fifth luminance control signal ADIM5 has the maximum level during the first period in which the LC response ratio LR is about 100%, and a changing level gradually decreasing from the maximum level to the preset level during the second period in which the LC response ratio LR falls from about 100% to about 30%.

The fifth light-emitting driving part 535 generates a fifth driving signal S5 based on the fifth driving control signal PWMS and the fifth luminance control signal ADIMS, and provides the fifth driving signal S5 to a plurality of LEDs of the fifth light-emitting block LBS. Thus, the fifth light-emitting block LB5 provides the light of a maximum luminance to the fifth display block DB5 during the first period I1 in which the left-eye or the right-eye image is completely displayed on the fifth display block DB5. The fifth light-emitting block LB5 provides the light at a luminance gradually decreasing from the maximum luminance to the preset luminance to the fifth display block DB5 during the second period I2 in which the transition image between the right-eye image and the black image is displayed on the fifth display block DB5. The fifth light-emitting block LB5 blocks the light from the fifth display block DB5 during the third period I3 in which the black image is completely displayed on the fifth display block DB5 and the transition image between the black image and the left-eye or the right-eye image is displayed on the fifth display block DB5.

Hereinafter, an exemplary embodiment of a method of driving an eighth display block DB8 and an eighth light-emitting block LB8 corresponding to the eighth display block DB8 will be described.

The data signal of the left-eye image frame L is provided to the eighth display block DB8 during a period beginning at a latter part of the N-th frame F_N, the data signal of the black image frame B is provided to the eighth display block DB8 during a period beginning at a latter part of the (N+1)-th frame F_N+1, the data signal of the right-eye image frame R is provided to the eighth display block DB8 during a period beginning at a latter part of the (N+2)-th frame F_N+2 and the data signal of the black image frame B is provided to the eighth display block DB8 during a period beginning at a latter part of the (N+3)-th frame F_N+3 (DB8_DATA).

An eighth driving control signal PWM8 and an eighth luminance control signal ADIM8 are provided to an eighth light-emitting driving part 538 of the light-source driving part 500a. The eighth luminance control signal ADIM8 has a period in synchronization with the eighth driving control signal PWM8 and is time-modulated based on the LC response ratio LR during the high period of the eighth driving control signal PWM8. The eighth luminance control signal ADIM8 has the maximum level during the first period in which the LC response ratio LR becomes about 100%, and a changing level gradually decreasing from the maximum level to the preset level during the second period in which the LC response ratio LR falls from about 100% to about 30%.

The eighth light-emitting driving part 538 generates an eighth driving signal S8 based on the eighth driving control signal PWM8 and the eighth luminance control signal ADIM8 and provides the eighth driving signal S8 to a plurality of LEDs of the eighth light-emitting block LB8. Thus, the eighth light-emitting block LB8 provides light at a maximum luminance to the eighth display block DB8 during the first period I1 in which the left-eye or the right-eye image is completely displayed on the eighth display block DB8. The eighth light-emitting block LB8 provides the light at a luminance gradually decreasing from the maximum luminance to the preset luminance to the eighth display block DB8 during the second period I2 in which the transition image between the right-eye image and the black image is displayed on the eighth display block DB8. The eighth light-emitting block LB8 blocks the light from the eighth display block DB8 during the third period I3 in which the black image is completely displayed on the eighth display block DB8 and the transition image between the black image and the left-eye or the right-eye image is displayed on the eighth display block DB8.

In an exemplary embodiment, the display apparatus may display the 3D stereoscopic image based on the exemplary embodiment of the method of driving the display panel 200 and the light-source part 400 described above.

In an exemplary embodiment, a viewer may view the 3D stereoscopic image displayed on the display apparatus through the glasses part 600.

As shown in FIG. 4, a left-eye shutter signal LSS has a high level and a right-eye shutter signal RSS has a low level during a period in which the left-eye image L is displayed on all of the first to eighth display blocks DB1 to DB8. The right-eye shutter signal RSS has the high level and the left-eye shutter signal LSS has the low level during a period in which the right-eye image R is displayed on all of the first to eighth display blocks DB1 to DB8. The left-eye shutter 610 and the right-eye shutter 620 of the glasses part 600 is driven in response to the left-eye shutter signal LSS and the right-eye shutter signal RSS in synchronization with the left-eye and the right-eye images L and R displayed on the display panel 200. Thus, the view may view the 3D stereoscopic image.

Figure 5:
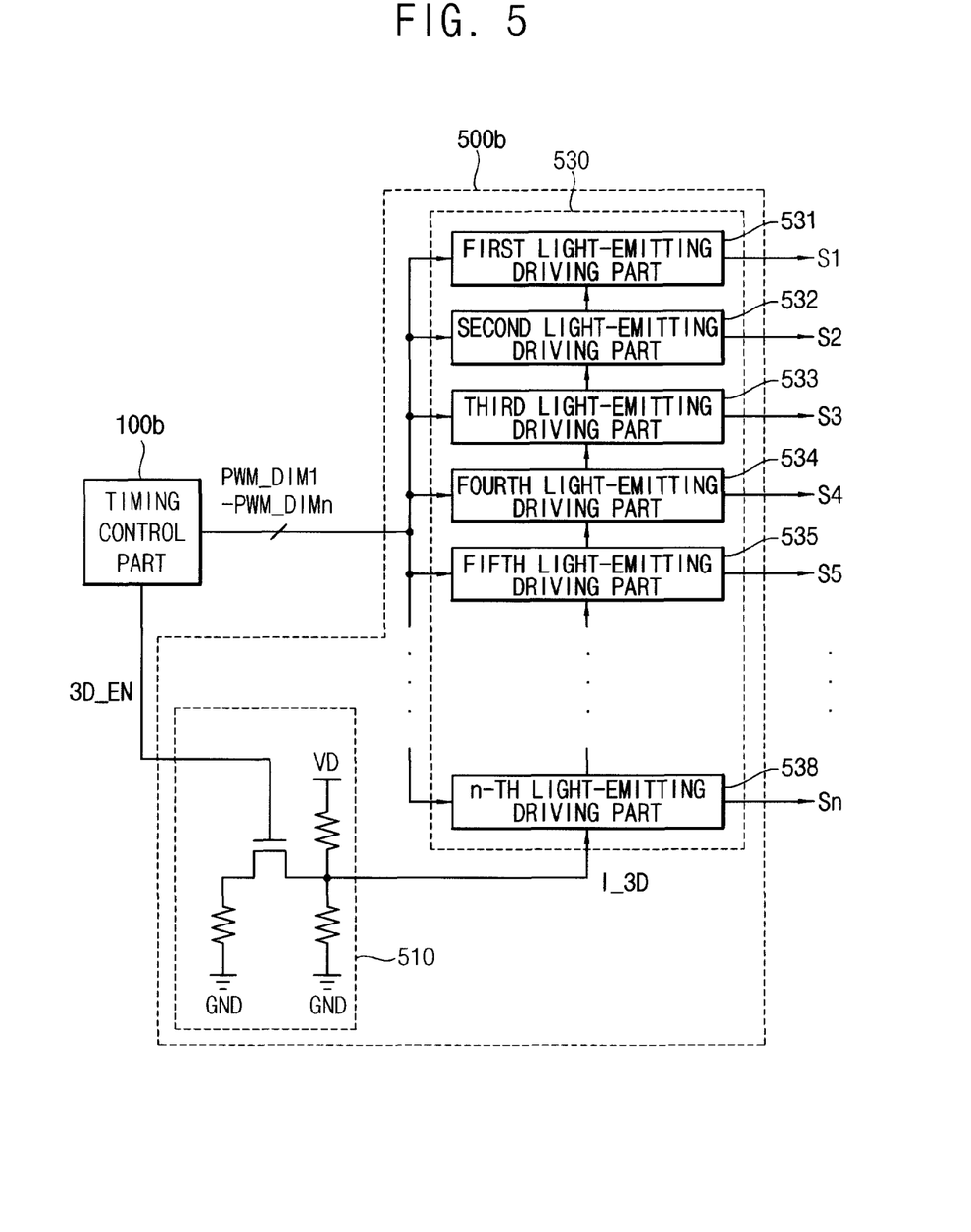
FIG. 5 is a block diagram illustrating an alternative exemplary embodiment of a display apparatus according to the invention.
Figure 6:
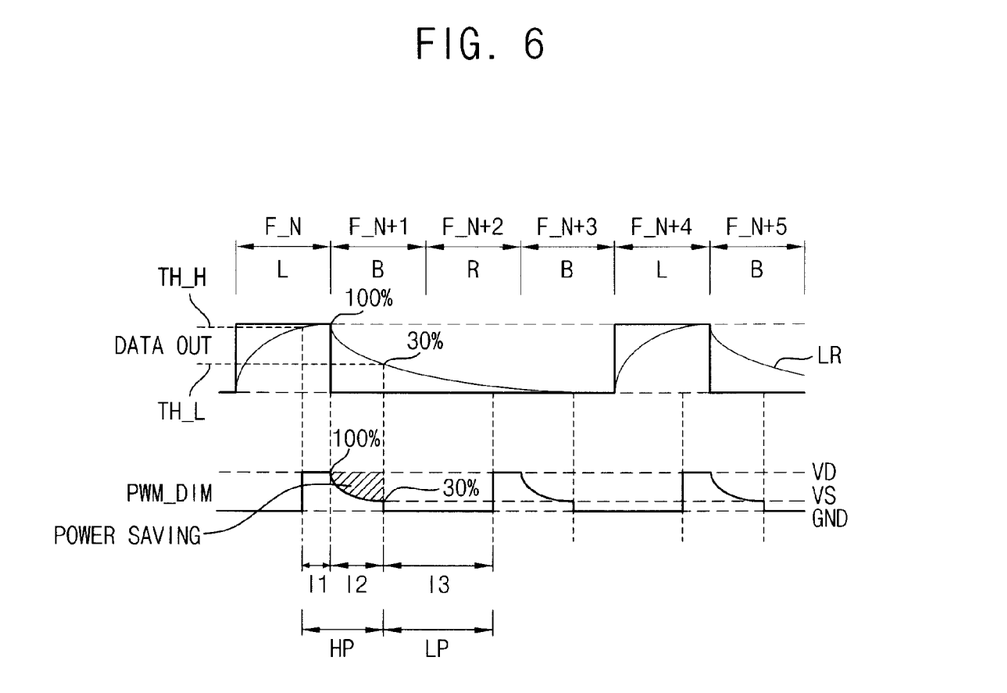
FIG. 6 is a signal timing diagram illustrating an exemplary embodiment of a method of displaying a 3D stereoscopic image used in the display apparatus of FIG. 5.

FIG. 5 is a block diagram illustrating an alternative exemplary embodiment of a display apparatus according to the invention. FIG. 6 is a signal timing diagram illustrating an exemplary embodiment of a method of displaying a 3D stereoscopic image used in the display apparatus of FIG. 5.

The display apparatus in FIG. 5 is substantially the same as the display apparatus described in FIGS. 1 and 2 except the timing control part 100b and the light-source driving part 500b. The same reference numerals will be used to refer to the same or like elements as those described in the example embodiment shown in FIGS. 1 and 2, and any repetitive detailed explanation will hereinafter be omitted or simplified.

Referring to FIGS. 5 and 6, the timing control part 100b provides a plurality of light-source control signals PWM_DIM1 to PWM_DIMn, to the light-source driving part 500b. Each of the light-source control signals includes the driving control signal PWM and the luminance control signal ADIM shown in FIG. 3.

The light-source driving part 500b includes a current generating part 510 and a signal generating part 530.

The current generating part 510 receives the 3D enable signal 3D_EN for identifying the display mode from the timing control part 100a and generates the current signal I_3D for the 3D display mode in response to the 3D enable signal 3D_EN.

The signal generating part 530 includes the light-emitting driving parts 531 to 538. The light-emitting driving parts 531 to 538 generates a plurality of driving signals S1 to Sn time-modulated based on the light-source control signals PWM_DIM1 to PWM_DIMn and provides the driving signals S1 to Sn to the light-emitting blocks LB1 to LBn.

In one exemplary embodiment, for example, a left-eye data signal L is outputted to the display block during an N-th frame F_N, a black data signal B is outputted to the display block during an (N+1)-th frame N+1, a right-eye data signal R is outputted to the display block during an (N+2)-th frame N+2, another black data signal B is outputted to the display block during an (N+3)-th frame N+3. The display block completely displays an image corresponding to the data signal after a timing in which the data signal is applied to the display block based on an LC response time.

The timing control part 100b generates the light-source control signal PWM_DIM based on the left-eye image, the right-eye image or the black image displayed on the display panel 200 based on the LC response time.

The light-source control signal PWM_DIM has a maximum level VD during a first period I1 in which the LC response ratio LR of the left-eye or the right-eye date signal becomes about 100%, and a changing level gradually decreasing from the maximum level VD to a preset level VS during a second period I2 in which the LC response ratio LR of the left-eye or the right-eye date signal falls from about 100% to about 30% by the black data signal. The light-source control signal PWM_DIM has a minimum level GND during a third period I3 between a timing when the LC response ratio LR of the left-eye or the right-eye data signal falls to about 30% by the black data signal and a timing when the LC response ratio LR of the left-eye or the right-eye data signal corresponding to the following frame becomes at about 100%.

In an exemplary embodiment, the signal generating part 530 generates a plurality of driving signals S1 to Sn based on the light-source control signals PWM_DIM1 to PWM_DIMn and provides the driving signals S1 to Sn to the light-emitting blocks LB1 to LBn.

In an exemplary embodiment, the light at a luminance gradually decreased from maximum luminance to preset luminance is provided to the display panel during the second period I2 in which the LC response ratio of the left-eye or the right-eye date signal such that the 3D stereoscopic image of the high luminance is displayed with substantially low power consumption.

In an exemplary embodiment, the luminance of the light is decreased during the second period I2 in which the transition image between the left-eye or the right-eye image and the black image is displayed such that a 3D crosstalk is substantially decreased, and display quality of the 3D stereoscopic image is substantially improved.

Figure 7:
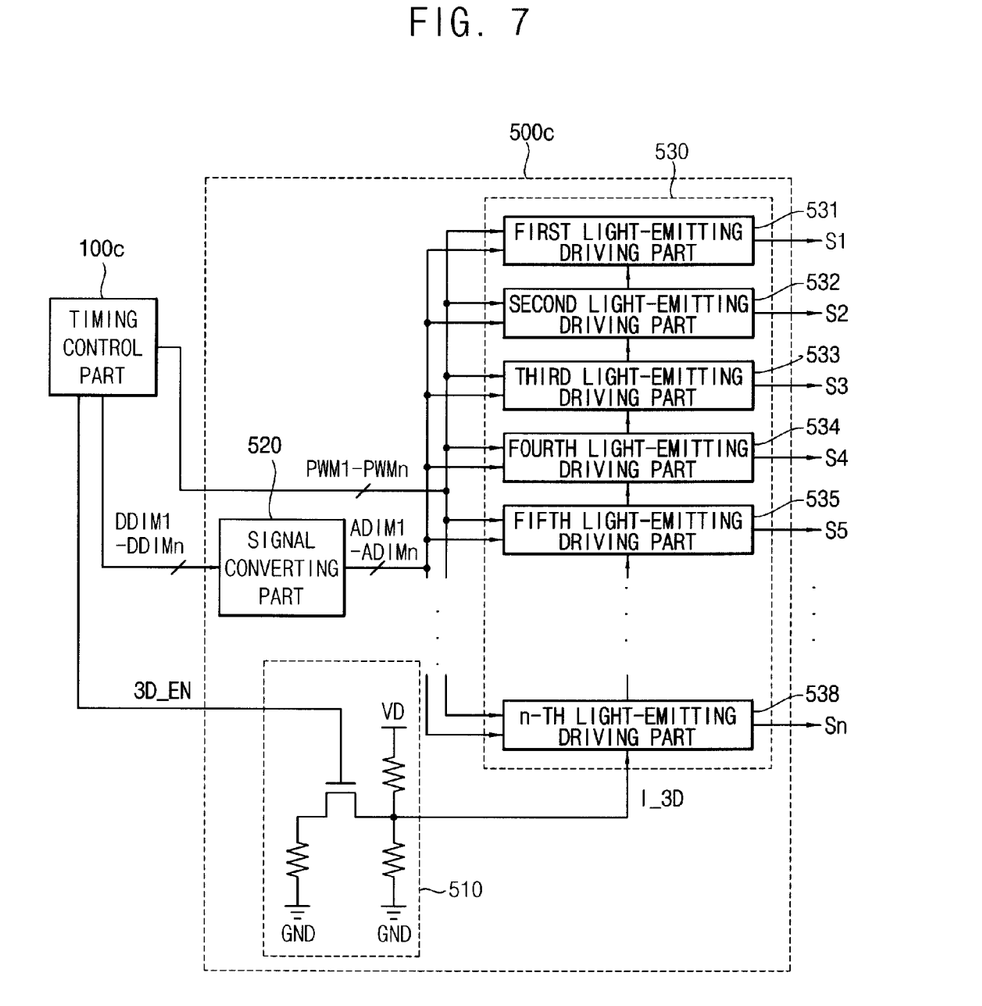
FIG. 7 is a block diagram illustrating another alternative exemplary embodiment of a display apparatus according to the invention.

FIG. 7 is a block diagram illustrating another alternative exemplary embodiment of a display apparatus according to the invention.

Referring to FIG. 7, an exemplary embodiment of the display apparatus includes a timing control part 100c and a light-source driving part 500c.

The timing control part 100c provides a plurality of driving control signals PWM1 to PWMn and a plurality of first luminance control signals DDIM1 to DDIMn of a digital type to the light-source driving part 500c. Each of the first luminance control signals DDIM1 to DDIMn is a luminance control signal based on the LC response time of the display panel 200.

The light-source driving part 500c includes a current generating part 510, a signal converting part 520 and a signal generating part 530.

The current generating part 510 is substantially the same as the exemplary embodiments shown in FIGS. 2 and 5, and generates the current signal 3D_En based on the 3D enable signal.

The signal converting part 520 converts the first luminance control signals DDIM1 to DDIMn of the digital type provided from the timing control part 100c into a plurality of first luminance control signals ADIM1 to ADIMn of an analogue type. A digital data communication between the timing control part 100c and the signal converting part 520 may be inter-integrated circuit ("I2C") or serial peripheral interface ("SPI"), for example.

The signal generating part 530 includes a plurality of light-emitting driving parts 531 to 538. The driving control signals PWM1 to PWMn and the second luminance control signals ADIM1 to ADIMn are provided to the light-emitting driving parts 531 to 538. The light-emitting driving parts 531 to 538 generates a plurality of driving signals S1 to Sn time-modulated based on the driving control signals PWM1 to PWMn and the second luminance control signals ADIM1 to ADIMn, and provides the driving signals S1 to Sn to the light-emitting blocks LB1 to LBn.

Figure 8:
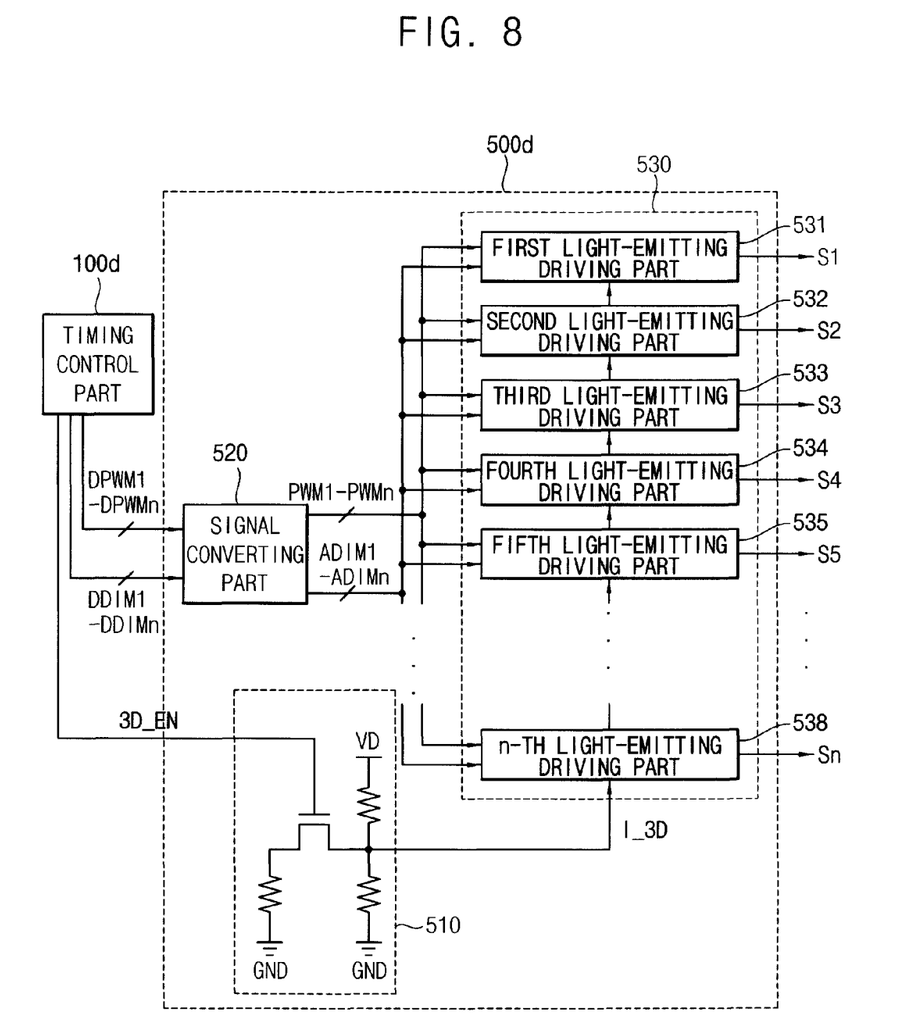
FIG. 8 is a block diagram illustrating still another alternative exemplary embodiment of a display apparatus according to the invention.

FIG. 8 is a block diagram illustrating still another alternative exemplary embodiment of a display apparatus according to the invention.

Referring to FIG. 8, an exemplary embodiment of the display apparatus includes a timing control part 100d and a light-source driving part 500d.

The timing control part 100d provides a plurality of first driving control signals DPWM1 to DPWMn and a plurality of first luminance control signals DDIM1 to DDIMn of the digital type to the light-source driving part 500d.

The light-source driving part 500d includes a current generating part 510, a signal converting part 520 and a signal generating part 530.

The current generating part 510 is substantially the same as the exemplary embodiments shown in FIGS. 2, 5 and 7, and generates the current signal 3D_En based on the 3D enable signal.

The signal converting part 520 converts the first driving control signals DPWM1 to DPWMn of the digital type provided from the timing control part 100c into a plurality of second driving control signals PWM1 to PWMn of an analogue type. The signal converting part 520 converts the luminance control signals DDIM1 to DDIMn of the digital type provided from the timing control part 100c into a plurality of second luminance control signals ADIM1 to ADIMn of the analogue type. A digital data communication between the timing control part 100d and the signal converting part 520 may be I2C or SPI, for example.

The signal generating part 530 includes a plurality of light-emitting driving parts 531 to 538. The second driving control signals PWM1 to PWMn and the second luminance control signals ADIM1 to ADIMn are provided to the light-emitting driving parts 531 to 538. The light-emitting driving parts 531 to 538 generates a plurality of driving signals S1 to Sn time-modulated based on the second driving control signals PWM1 to PWMn and the second luminance control signals ADIM1 to ADIMn and provides the driving signals S1 to Sn to the light-emitting blocks LB1 to LBn.

Figure 9:
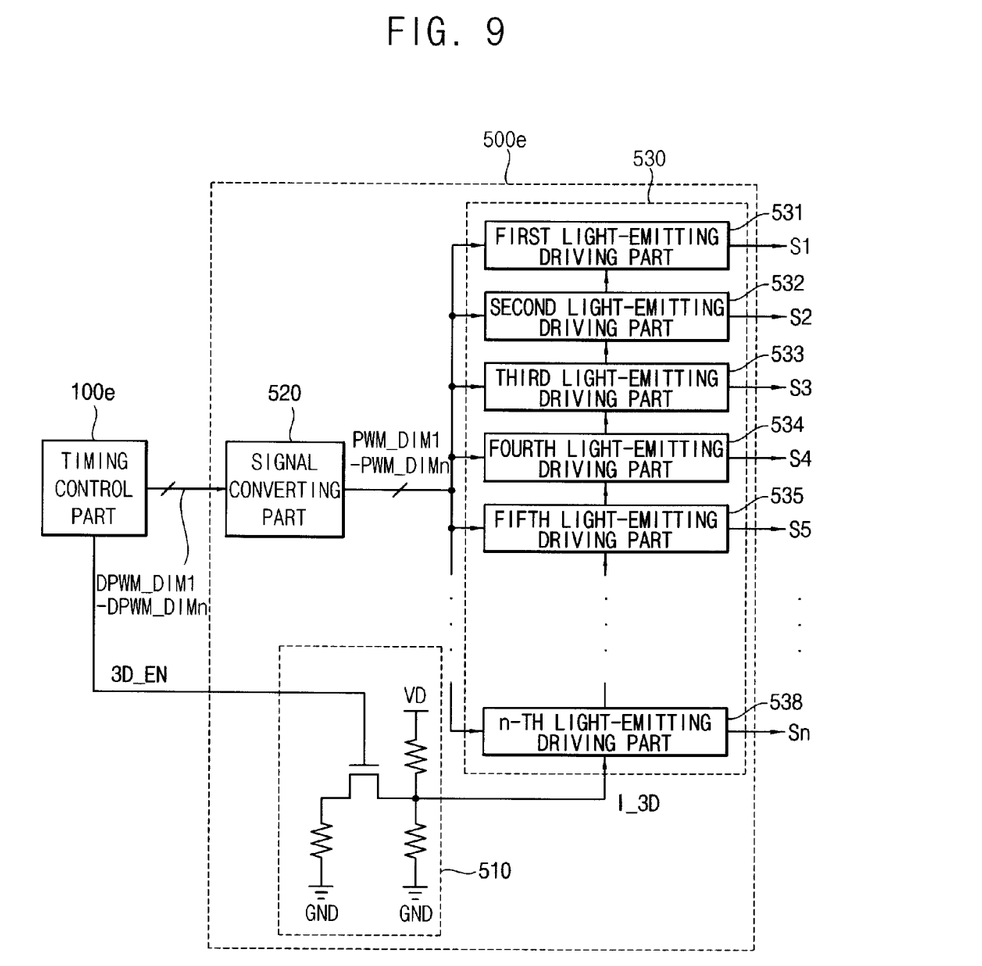
FIG. 9 is a block diagram illustrating yet another alternative exemplary embodiment of a display apparatus according to the invention.

FIG. 9 is a block diagram illustrating yet another alternative exemplary embodiment of a display apparatus according to the invention.

Referring to FIG. 9, an exemplary embodiment of the display apparatus includes a timing control part 100e and a light-source driving part 500e.

The timing control part 100e provides a plurality of first light-source control signals DPWM_DIM1 to DPWM_DIMn of the digital type to the light-source driving part 500e.

The light-source driving part 500e includes a current generating part 510, a signal converting part 520 and a signal generating part 530.

The current generating part 510 is substantially the same as the exemplary embodiments shown in FIGS. 2, 5, 7 and 8, and generates the current signal 3D_En based on the 3D enable signal.

The signal converting part 520 converts a plurality of first light-source control signals DPWM_DIM1 to DPWM_DIMn of the digital type provided from the timing control part 100c into a plurality of second light-source control signals PWM_DIM1 to PWM_DIMn of the analogue type. The second light-source control signals PWM_DIM1 to PWM_DIMn are substantially the same as the light-source control signals PWM_DIM1 to PWM_DIMn described above. A digital data communication between the timing control part 100e and the signal converting part 520 may be I2C or SPI, for example.

The signal generating part 530 includes a plurality of light-emitting driving parts 531 to 538. The second light-source control signals PWM_DIM1 to PWM_DIMn are provided to the light-emitting driving parts 531 to 538. The light-emitting driving parts 531 to 538 generates a plurality of driving signals S1, S2, . . . , Sn time-modulated based on the second light-source control signals PWM_DIM1 to PWM_DIMn and provides the driving signals S1 to Sn to the light-emitting blocks LB1 to LBn.

According to an exemplary embodiment of the invention set forth herein, in the 3D display mode, luminance of the light is adjusted based on a LC response time of the transition image between the left-eye or the right-eye image and the black image such that the 3D stereoscopic image of high luminance is displayed with substantially low power consumption. In an exemplary embodiment, the luminance of the light is decreased during the second period I2 in which the transition image displayed during a change from the left-eye or the right-eye image to the black image is displayed such that the 3D crosstalk is substantially decreased, and display quality of the 3D stereoscopic image is substantially improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of displaying a three-dimensional image, the method comprising:
   sequentially providing light to a plurality of display blocks of a display panel in a scan direction of an image;
   providing the light of a maximum luminance to a display block during a first period in which a left-eye or a right-eye image is displayed on the display block;
   providing the light of a gradual luminance gradually decreasing from the maximum luminance to a preset luminance to the display block during a second period in which a transition image between the left-eye or the right-eye image and a black image is displayed on the display block; and
   blocking the light from the display block during a third period including a period in which the black image is displayed on the display block and prior to a period in which a left-eye or a right-eye image of a following frame is displayed on the display block,
   wherein the light of the maximum luminance is generated from a light source driven based on a control signal having a maximum level during the first period, the light of the gradual luminance is generated from the light source driven based on a control signal having a level gradually decreasing from the maximum level to a preset level during the second period, and the light is blocked based on a control signal having a minimum level during the third period.

2. The method of claim 1, wherein the light of the maximum luminance is provided to the display block during an interval from a first timing, delayed from a timing when a data signal of the left-eye or the right-eye image is provided to the display block, to a second timing when a data signal of the black image is provided to the display block.

3. The method of claim 2, wherein a liquid crystal response ratio of the display block corresponding to the data signal of the left-eye or the right-eye image is greater than or equal to a high threshold value in the first period.

4. The method of claim 2, wherein the light gradually decreasing is provided to the display block during an interval from the second timing when the data signal of the black image is provided to the display block to a third timing.

5. The method of claim 4, wherein the third timing is when the liquid crystal response ratio of the display block corresponding to the data signal of the left-eye or the right-eye image becomes a low threshold value.

6. The method of claim 4, wherein the light is blocked from the display block during an interval from the third timing to a fourth timing.

7. The method of claim 6, wherein the fourth timing is when the liquid crystal response ratio of the display block corresponding to the left-eye or the right-eye data signal of the following frame becomes the high threshold value.

8. A method of displaying a three-dimensional image, the method comprising:
   providing light of a maximum luminance to a display block during a first period in which a left-eye or a right-eye image is displayed on the display block;
   providing the light of a gradual luminance gradually decreasing from the maximum luminance to a preset luminance to the display block during a second period in which a transition image between the left-eye or the right-eye image and a black image is displayed on the display block; and
   blocking the light from the display block during a third period including a period in which the black image is displayed on the display block and prior to a period in which a left-eye or a right-eye image of a following frame is displayed on the display block,
   wherein the light of the maximum luminance is generated from a light source driven based on a control signal having a maximum level during the first period, the light of the gradual luminance is generated from the light source driven based on a control signal having a level gradually decreasing from the maximum level to a preset level during the second period, and the light is blocked based on a control signal having a minimum level during the third period.

9. A display apparatus comprising:
   a display panel including a plurality of display blocks, the display blocks display an image;
   a light-source including a plurality of light-emitting blocks arranged in a direction scanning the image, wherein each of the light-emitting blocks provides light to a display block of the plurality of display blocks corresponding thereto; and
   a light-source driver configured to drive the light-source, the light-source driver drives the light-source to provide light of a maximum luminance to a display block during a first period in which a left-eye or a right-eye image is displayed on the display block, the light-source driver drives the light-source to provide the light of a gradual luminance gradually decreasing from the maximum luminance to a preset luminance to the display block during a second period in which a transition image between the left-eye or the right-eye image and a black image is displayed on the display block, and the light-source driver drives the light-source to block the light from the display block during a third period including a period in which the black image is displayed on the display block and prior to a period in which a left-eye or a right-eye image of a following frame is displayed on the display block,
   wherein the light of the maximum luminance is generated from a light source driven based on a control signal having a maximum level during the first period, the light of the gradual luminance is generated from the light source driven based on a control signal having a level gradually decreasing from the maximum level to a preset level during the second period, and the light is blocked based on a control signal having a minimum level during the third period.

10. The display apparatus of claim 9, wherein the light-source driver comprises:
   a current generator that generates a current signal in response to a three-dimensional enable signal; and
   a signal generator that provides a plurality of driving signals to the light-emitting blocks based on the current signal.

11. The display apparatus of claim 10, wherein the signal generator includes a plurality of light-emitting drivers which provides the driving signals to the light-emitting blocks.

12. The display apparatus of claim 10, further comprising:
   a timing controller that generates a driving control signal of an analogue type and a luminance control signal of the analogue type, and provides the driving control signal of the analogue type and the luminance control signal of the analogue type to the signal generator, wherein the driving control signal of the analogue type has a high level during the first period and the second period and has a low level during the third period, and wherein the luminance control signal of the analogue type has a maximum level during the first period, has a level gradually decreasing from the maximum level to a preset level during the second period, and has a minimum level during the third period.

13. The display apparatus of claim 10, further comprising:
a timing controller that generates a light-source control signal of an analogue type, and provides the light-source control signal of the analogue type to the signal generator, wherein the light-source control signal of the analogue type has a maximum level during the first period, has a level gradually decreasing from the maximum level to a preset level during the second period, and has a minimum level during the third period.

14. The display apparatus of claim 9, wherein the light-source driver comprises:
a current generator that generates a current signal in response to a three-dimensional enable signal;
a signal converter that converts a control signal of a digital type into a control signal of an analogue type; and
a signal generator that provides a plurality of driving signals to the light-emitting blocks based on the current signal.

15. The display apparatus of claim 14, further comprising:
a timing controller that generates a driving control signal of an analogue type and an luminance control signal of a digital type, and provides the driving control signal of the analogue type and the luminance control signal of the digital type to the light-source driver, wherein the driving control signal of the analogue type has a high level during the first period and the second period, and has a low level during the third period, wherein the luminance control signal of the digital type has a maximum level in the first period, has a level gradually decreasing from the maximum level to a preset level during the second period, and has a minimum level during the third period, and wherein the driving control signal of the analogue type is provided to the signal generator, the luminance control signal of the digital type is converted into a luminance control signal of an analogue type by the signal converter, and the luminance control signal of the analogue type is provided to the signal generator.

16. The display apparatus of claim 14, further comprising:
a timing controller that generates a driving control signal of an digital type and a luminance control signal of an digital type, and provides the driving control signal of the digital type and the luminance control signal of the digital type to the light-source driver, wherein the driving control signal of the digital type has a high level during the first period and the second period, and has a low level during the third period, wherein the luminance control signal of an digital type has a maximum level during the first period, has a level gradually decreasing from the maximum level to a preset level during the second period, and has a minimum level during the third period, and wherein the driving control signal of the digital type and the luminance control signal of the digital type are converted into the driving control signal of an analogue type and the luminance control signal of an analogue type, respectively, by the signal converter, and the driving control signal of the analogue type and the luminance control signal of the analogue type are provided to the signal generator.

17. The display apparatus of claim 14, further comprising:
a timing controller that generates a light-source control signal of a digital type, and provides the light-source control signal of the digital type to the signal generator, wherein the light-source control signal of the digital type has a maximum level during the first period, has a level gradually decreasing from the maximum level to a preset level during the second period, and has a minimum level during the third period, and wherein the light-source control signal of the digital type is converted into the light-source control signal of an analogue type by the signal converter, and the light-source control signal of the analogue type is provided to the signal generator.

18. The display apparatus of claim 9, further comprising:
a panel driver that sequentially provides a data signal of the left-eye image, a data signal of the black image, a data signal of the right-eye image and a data signal of the black image to the display panel frame-by-frame.

19. The display apparatus of claim 9, wherein the light-source driver provides the light of the maximum luminance to the display block during an interval from a first timing, delayed from a timing when a data signal of the left-eye or the right-eye image is provided to the display block, to a second timing when a data signal of the black image is provided to the display block, the first timing is when an liquid crystal response ratio of the display block corresponding to the data signal of the left-eye or the right-eye image becomes a high threshold value, and the second timing is when the data signal for the black image is applied to the display block.

20. The display apparatus of claim 19, wherein the light-source driver providing the light gradually decreasing to the display block during an interval from the second timing to a third timing, and the third timing is when the liquid crystal response ratio of the display block corresponding to the data signal of the left-eye or the right-eye image becomes a low threshold value.

* * * * *